United States Patent
Kreischer et al.

(10) Patent No.: US 6,363,910 B1
(45) Date of Patent: Apr. 2, 2002

(54) APPARATUS FOR SPEED LIMITATION OF ENGINES AND/OR FOR VELOCITY LIMITATION OF ENGINE-DRIVEN MOTOR VEHICLES

(75) Inventors: Thomas Kreischer, Waiblingen; Hartmut Weckenmann, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/546,102

(22) Filed: Apr. 10, 2000

(30) Foreign Application Priority Data

Apr. 13, 1999 (DE) .......................................... 199 16 491
Jun. 10, 1999 (DE) .......................................... 199 26 351

(51) Int. Cl.[7] .......................... F02M 41/00; F02M 31/00
(52) U.S. Cl. ................... 123/339.16; 123/352; 123/436
(58) Field of Search ................................ 123/332–335, 123/436, 339.1, 339.14, 339.16, 352; 180/170, 178, 179

(56) References Cited

U.S. PATENT DOCUMENTS 4,693,077 A * 9/1987 Skarvan et al. ............. 123/436
4,886,140 A * 12/1989 Leiber et al. ................ 180/197
6,078,859 A * 6/2000 Jastrzebski et al. ......... 123/352

FOREIGN PATENT DOCUMENTS

| DE | 39 37 846 | 5/1991 |
| DE | 43 27 654 | 2/1994 |
| DE | 44 34 022 | 3/1996 |

* cited by examiner

Primary Examiner—Henry C. Yuen
Assistant Examiner—Arnold Castro
(74) Attorney, Agent, or Firm—Kenyon & Kenyon

(57) ABSTRACT

Engine speed and/or vehicle velocity limitation apparatus of engine-driven motor vehicles, wherein a controller defines, as a function of the difference between an actual speed value or actual velocity value as controlled variable, on the one hand, and a speed limit value or velocity limit value or a speed limit function or velocity limit function, on the other hand, a torque setpoint for the engine of the motor vehicle as the manipulated variable. As a result, the combustion processes occur at the stoichiometric ratio even during the limiting operation, and the elimination of torque surges results in a considerable increase in drivability for the driver.

18 Claims, 2 Drawing Sheets

APPARATUS FOR SPEED LIMITATION OF ENGINES AND/OR FOR VELOCITY LIMITATION OF ENGINE-DRIVEN MOTOR VEHICLES

FIELD OF THE INVENTION

The present invention relates to an apparatus for speed limitation of engines and/or for velocity limitation of engine-driven motor vehicles, having a controller that regulates the engine speed to an applied maximum permissible speed or regulates it to a speed that corresponds to an applied maximum permissible velocity.

RELATED TECHNOLOGY

In current production vehicles, speed limitation is accomplished by fuel blanking, i.e. if the predefined maximum permissible speed limit is exceeded, individual cylinders are shut down. The disadvantages of the this type of speed limitation system are that it is impossible to output a defined actual torque to external control units. Since combustion can no longer occur at the stoichiometric ratio when speed limitation has been instituted, emissions values deteriorate. In addition, the shutdown and initiation of injection occurring with such speed limitation systems cause severe torque surges, which result in a severe impairment of drivability.

German Patent No. 39 37 846 A1 describes an apparatus for speed limitation of engines having a controller for which, as a function of the difference between an actual speed value as controlled variable and a speed limit value, a torque setpoint (load torque) is defined as the manipulated variable. Also, German Patent No. 43 27 654 A1 and German Patent No. 44 34 022 A1, describe apparatuses for velocity limitation of engine-driven motor vehicles having a controller that correspondingly, as a function of the difference between an actual velocity value as controlled variable and a velocity limit value, defines a torque setpoint for the engine of the motor vehicle as the manipulated variable. These known apparatuses do achieve better drivability as compared to a cylinder shutdown system, but on the one hand disadvantages in terms of emissions values must be accepted, and on the other hand the resulting drivability has still not proven to be adequate.

SUMMARY OF THE INVENTION

An object of the present invention is to create an apparatus for speed limitation and/or velocity limitation that operates more smoothly and with better emissions values than conventional apparatuses, and can be utilized regardless of the type of engine used.

The present invention provides an apparatus for speed limitation of engines, having a controller (13) that, as a function of the difference ($n_{diff}$) between an actual speed value ($n_{ist}$) as controlled variable and a speed limit value or a speed limit function ($n_{maxeff}$), defines a torque setpoint ($m_{vorg}$) for the engine as the manipulated variable. The controller (13) is equipped with means (10–12) for defining the torque setpoint ($m_{vorg}$) as a function of the gradient ($n_{grad}$) of the controlled variable ($n_{ist}$). Means (11) for constituting a reduction torque ($m_{red}$) as a function of the gradient ($n_{grad}$) of the controlled variable ($n_{ist}$) and of the actual torque value ($m_{ist}$) are provided. A subtraction stage (12), in order to constitute an anticipated torque ($m_{vorh}$) from the difference between the reduction torque ($m_{red}$) and the actual torque value ($m_{ist}$), is in working engagement with the controller (13) to define the torque setpoint ($m_{vorg}$) as a function of the anticipated torque ($m_{vorh}$).

The present invention also provides an apparatus for velocity limitation of engine-driven motor vehicles, having a controller (13) that, as a function of the difference between an actual velocity value as controlled variable and a velocity limit value or a velocity limit function, defines a torque setpoint ($m_{vorg}$) for the engine of the motor vehicle as the manipulated variable. The controller (13) is equipped with means (10–12) for defining the torque setpoint ($m_{vorg}$) for the engine of the motor vehicle as the manipulated variable. Means (11) for constituting a reduction torque ($m_{red}$) as a function of the gradient ($n_{grad}$) of the controlled variable ($n_{ist}$) and of the actual torque value ($m_{ist}$) are provided. A subtraction stage (12), in order to constitute an anticipated torque ($m_{vorh}$) from the difference between the reduction torque ($m_{red}$) and the actual torque value ($m_{ist}$), is in working engagement with the controller (13) to define the torque setpoint ($m_{vorg}$) as a function of the anticipated torque ($m_{vorh}$).

With the torque-based speed limitation system and velocity limitation system according to the present invention, the controller is advantageously equipped with means for defining the torque setpoint as a function of the gradient of the controlled variable. In this context, means for constituting a reduction torque as a function of the gradient of the controlled variable and of the actual torque value, in particular by way of a characteristics diagram, are preferably also provided. A subtraction stage then serves to constitute an anticipated torque from the difference between the reduction torque and the acrual torque value. This is in working engagement with the controller in order to define the torque setpoint as a function of this anticipated torque. Influencing the torque setpoint by way of the gradient of the controlled variable, i.e. the actual torque value and/or actual velocity value, especially by way of the anticipated torque constituted according to the present invention, contributes substantially to the increase in drivability, and allows limitation to occur smoothly. The combustion processes occur at a stoichiometric ratio (lambda=1), so that good emissions values are maintained even while speed is being limited. Torque surges are prevented, which results in a considerable improvement in drivability for the driver of a motor vehicle.

Advantageously, a limit function stage is provided in order to constitute the speed limit function if the actual speed value exceeds a maximum continuous speed. This limit function stage preferably possesses a timing element for defining a maximum speed that exceeds the maximum continuous speed for a definable time period; a ramp generator is then provided in order to return the maximum speed to the maximum continuous speed after the definable time period. Allowing the maximum continuous speed to be exceeded briefly in this fashion also prevents torque surges, since it is thereby possible, by avoiding such torque surges, to return smoothly to the maximum continuous speed. This limit function stage thus prevents unpleasant surges even if the maximum continuous speed is exceeded as a result of a sharp rise in torque.

A subtraction stage is advantageously provided in order to constitute the difference between the speed limit function or the speed limit value and the actual speed value; this difference can then be conveyed to an input of the controller.

In order to avoid unnecessary control operations and to relieve stress on the controller, it is advantageous to provide a logic stage to constitute an anticipated value as a function of the gradient of the controlled variable and of the limit value or the limit function; a first comparison stage activates the controller if the controlled variable exceeds this anticipated variable and/or deactivates it if it falls below. This means that the greater the (positive) gradient of the speed or the velocity, the earlier the controller is activated. Because of this correlation with the gradient, the controller is optimally initiated or activated when such is necessary in order to prevent predefined limit values from being exceeded.

The logic stage can also, advantageously, have at least one second comparison stage that deactivates the controller if the controlled variable falls below a fixed value which is below the anticipated value. This ensures reliable shutdown of the controller if the difference between the controlled variable and the limit value has become sufficiently great.

A controller configured substantially as a PI controller is principally suitable for the speed limitation system or velocity limitation system. In this context, the torque setpoint constituted as the manipulated variable is provided in particular in order to intervene on devices for controlling the system regulating the delivery of air and/or fuel to the engine; acting on the air delivery system has proven to be particularly favorable. With an intervention of this kind, the combustion operations take place substantially at a stoichiometric ratio (lambda=1).

An exemplary embodiment of the present invention is depicted in the drawings and explained in more detail in the description below. In the drawings:

DETAILED DESCRIPTION

Figure 1:
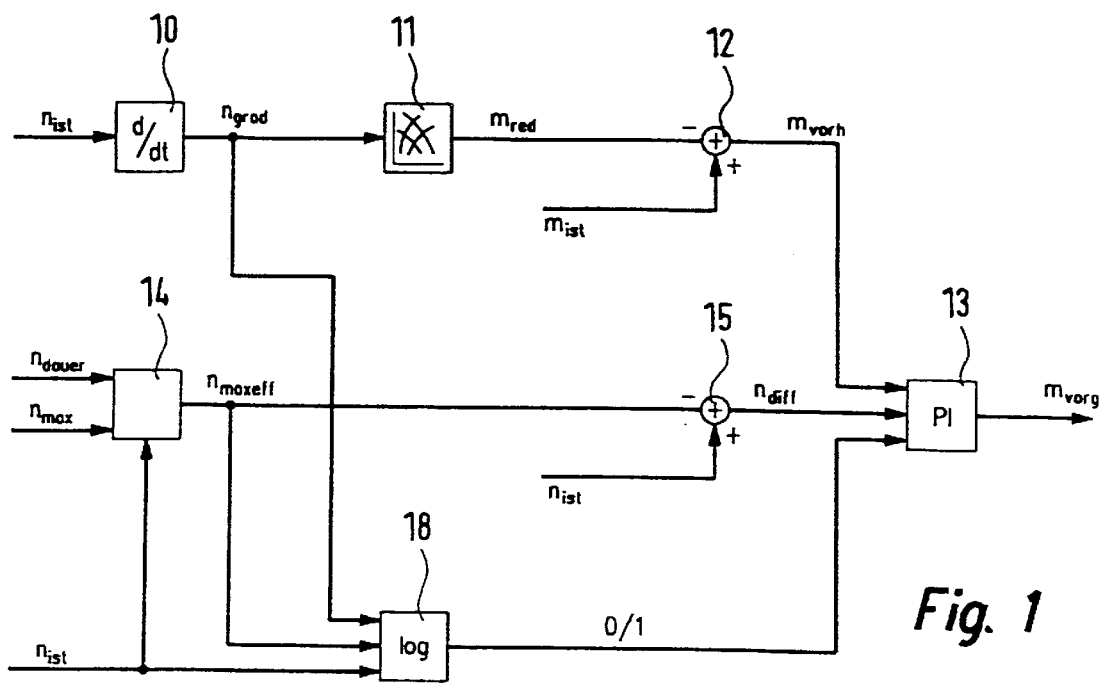
FIG. 1 shows a block diagram of an apparatus for speed limitation of engines, as an embodiment of the present invention.

In the embodiment depicted in FIG. 1, the actual speed value $n_{ist}$ of an internal combustion engine of a motor vehicle, sensed by way of an ordinary speed sensor, is conveyed to a gradient stage 10 in order to constitute a speed gradient $n_{grad}$. By way of a characteristics diagram 11, a reduction torque $m_{red}$ is then constituted as a function of that speed gradient $n_{grad}$ and an actual torque value $m_{ist}$ of the internal combustion engine. The actual torque value $m_{ist}$ is usually determined by calculation, for example from the air mass flow and the engine speed, or from the delivered fuel quantity and the engine speed. The greater the speed gradient $n_{grad}$, the greater the reduction torque $m_{red}$ becomes. Therefore, the more quickly the actual torque value $n_{ist}$ approaches the limit value, the greater the reduction in the torque must be in order to prevent this speed threshold from being exceeded.

In a subsequent subtraction stage 12, this reduction torque $m_{red}$ is then subtracted from the actual torque value $m_{ist}$, yielding an anticipated torque $m_{vorh}$ that is delivered to a PI controller 13. This anticipated torque $m_{vorh}$ therefore influences controller 13 in such a way that the manipulated variable which is output, i.e. the torque setpoint $m_{vorg}$, depends not only on the system deviation but additionally on the speed gradient $n_{grad}$. This means that not only the system deviation but also this anticipated torque $m_{vorh}$ acts on the torque setpoint $m_{vorg}$ in such a way that it becomes smaller, the greater the speed gradient $n_{grad}$.

Figure 2:
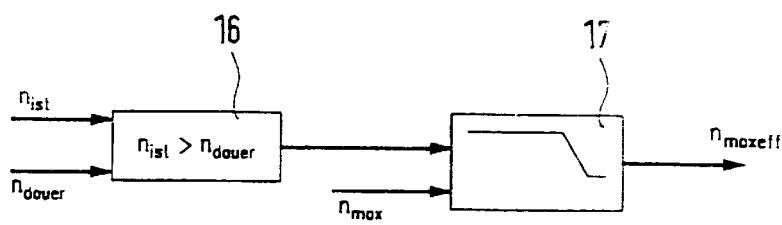
FIG. 2 shows a more detailed depiction of the limit function stage depicted in FIG. 1.

A limit function stage 14 serves to ascertain the current limit speed $n_{maxeff}$ for soft speed limitation. This limit speed $n_{maxeff}$ is constituted as a function of the maximum continuous speed $n_{dauer}$, the maximum speed $n_{max}$, and the actual speed value $n_{ist}$, as will be explained in further detail with reference to FIGS. 2 and 3. $n_{dauer}$ and $n_{max}$ are fixed quantities that are determined individually for each type of internal combustion engine.

A downstream subtraction stage 15 constitutes the differential value $n_{diff}$ between the actual speed value $n_{ist}$ and the limit speed $n_{maxeff}$ constituted in limit function stage 14. This value is conveyed as the controlled variable to controller 13 which, by correspondingly reducing the torque setpoint $m_{vorg}$, brings this differential value $n_{diff}$ back toward zero. This means that in the event the maximum continuous speed $n_{dauer}$ is exceeded, the speed is smoothly brought back to this value of the continuous speed $n_{dauer}$. This is explained below with reference to FIGS. 2 and 3.

Figure 3:
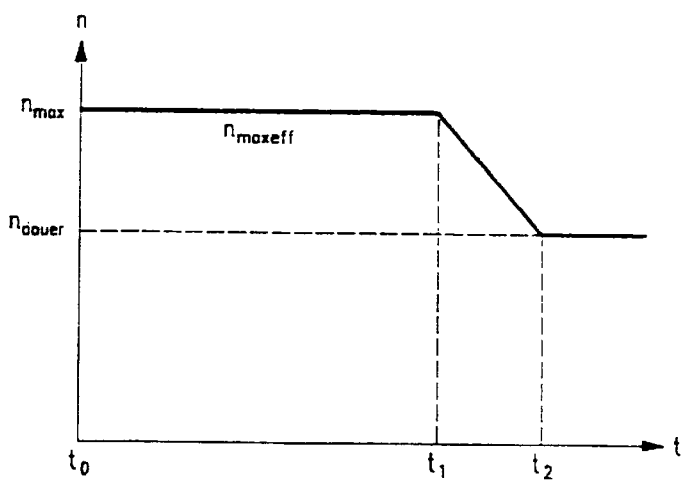
FIG. 3 shows a signal diagram to explain the manner of operation of the limit function stage.

Limit function stage 14 is activated only if the actual speed value $n_{ist}$ exceeds the maximum continuous speed $n_{dauer}$. This initialization is performed by way of a comparison stage 16. In a downstream function generator 18, to which the maximum speed $n_{max}$ is supplied as a value, the limit function depicted in FIG. 3 is then constituted. After initialization at time $t_0$, first the value of the maximum speed $n_{max}$ for a definable time period t1 is defined. Then this value is ramped, by way of a ramp generator, back to the value of the maximum continuous speed $n_{dauer}$. By way of this function for the limit speed $n_{maxeff}$, the actual speed $n_{ist}$ is thus, if the maximum speed $n_{dauer}$ is exceeded, brought in smooth and controlled fashion, by way of a ramp, to this value of the maximum continuous speed $n_{dauer}$, which is accomplished by controller 13. Once the continuous speed $n_{dauer}$ has been reached, the limit speed $n_{maxeff}$ remains at that value, and cannot return briefly to the value of the maximum speed $n_{max}$ until its value has fallen below a defined reset value, and controller 13 is no longer feeding through. Only then can another cycle be run through using comparison stage 16.

Figure 4:
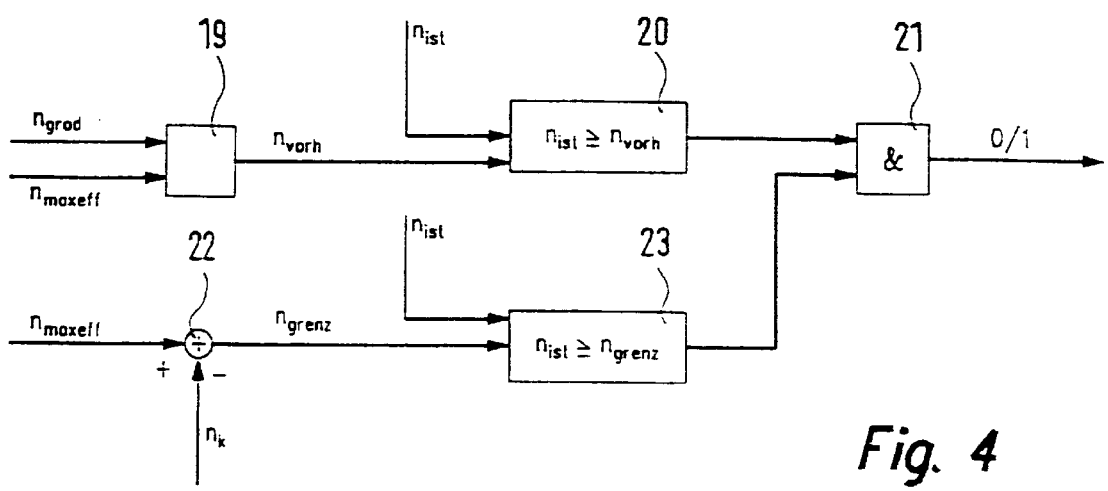
FIG. 4 shows a more detailed depiction of the logic stage depicted in FIG. 1.

A logic stage 18 serves to activate (output signal 1) and deactivate (output signal 0) controller 13 as a function of the speed gradient $n_{grad}$, the limit speed $n_{maxeff}$, and the actual speed value $n_{ist}$. This logic stage 18 is depicted in more detail in FIG. 4 and will be explained below with reference to FIG. 4.

A speed anticipation threshold $n_{vorg}$ is determined that is dependent on speed gradient. This is constituted in a function stage 19 on the basis of the speed gradient $n_{grad}$ and the limit speed $n_{maxeff}$. A subsequent comparison stage 20 checks whether the actual speed value $n_{ist}$ has reached or exceeded this speed anticipation threshold $n_{vorh}$. If so, an activation of controller 13 takes place by way of an anticipation bit, via an AND stage 21. The result of this is that the greater the speed threshold, the earlier controller 13 is activated (i.e. at lower actual speed values).

If the actual speed falls below an applicable shutdown threshold $n_{grenz}$ that lies below the anticipation threshold $n_{vorh}$, controller 13 is deactivated. This shutdown threshold $n_{grenz}$ is constituted, as a difference between the limit speed $n_{maxeff}$ and a fixed value $n_K$, in a subtraction stage 22. Of course this shutdown threshold $n_{grenz}$ could also be defined directly as a fixed value. A downstream comparison stage 23 then checks whether the actual speed value $n_{ist}$ is equal to or greater than this shutdown threshold $n_{grenz}$. If so, AND stage 21 becomes conductive for signals of comparison stage 20. Otherwise AND stage 21 is inhibited, and controller 13 is thus shut down or deactivated.

This deactivation or direct shutdown of controller 13 can be accomplished without further secondary conditions, but further conditions can also be met for deactivation; for example, deactivation can be completed only if the controller torque is maintaining no further feedthrough. In the case of a shutdown with multiple secondary conditions, several such lines with comparison stages can be present so as to effect stepwise deactivation and activation of controller 13.

Controller 13, presented in FIG. 1 as a PI controller, can in principle also exhibit a different controller characteristic, e.g. P, I, PID, or the like. Individual controller sections can also be activated or deactivated as a function of controller parameters.

The exemplary embodiment described with reference to FIGS. 1 through 4 concerns an apparatus for speed limitation of engines. An apparatus for velocity limitation of engine-driven motor vehicles can also, however, be correspondingly implemented, in which case speed variables are to be replaced respectively by velocity variables. What is essential in this context is that in the case of velocity limitation as well, controller 13 defines a torque setpoint for the engine of the motor vehicle as the manipulated variable. A combined apparatus for speed limitation and velocity limitation can also be correspondingly implemented, in which case precedence is to be given, in the event of conflicting parameters, to the smaller defined torque $m_{vorg}$.

The torque setpoint $m_{vorg}$ constituted by the controller as the manipulated variable acts, for example, on an actuating apparatus for the throttle valve of an internal combustion engine, i.e. acts on the air delivery system of the internal combustion engine, which represents a preferred solution. As an alternative to this, it would also be possible to act on the fuel delivery system, which may represent the most sensible solution in the case of a diesel engine. A combined intervention is also possible.

The present invention is not limited, however, to the speed limitation of internal combustion engines or to the velocity limitation of combustion-powered motor vehicle, but can also be applied to other types of engines, for example electric motors. In the case of an electric motor, the torque setpoint $n_{vorg}$ acts as manipulated variable, for example via an electronic control system, on the current and/or voltage being supplied to the electric motor.

What is claimed is:

1. An apparatus for limiting a speed of an engine, the apparatus comprising:
   a controller for defining a torque setpoint for the engine as a manipulated variable, the torque setpoint being defined as a function of a difference between an actual speed value and a speed limit value or speed limit function, the actual speed value defining a controlled variable, the controller including a torque setpoint determining device for further determining the torque setpoint as a function of a gradient of the controlled variable and a torque reduction determining device for determining a reduction torque as a function of the gradient of the controlled variable and of an actual torque value; and
   a subtraction stage in working engagement with the controller for further defining the torque setpoint as a function of an anticipated torque, the subtraction stage determining the anticipated torque from a difference between the reduction torque and the actual torque value.

2. An apparatus for limiting a velocity of an engine-driven motor vehicle the apparatus comprising:
   a controller for defining a torque setpoint for the engine as a manipulated variable, the torque setpoint being defined as a function of a difference between an actual velocity value and a velocity limit value or velocity limit function, the actual velocity value defining a controlled variable, the controller including a torque setpoint determining device for further determining the torque setpoint as a function of a gradient of the controlled variable and a torque reduction determining device for determining a reduction torque as a function of the gradient of the controlled variable and of an actual torque value; and
   a subtraction stage in working engagement with the controller for further defining the torque setpoint as a function of an anticipated torque, wherein the subtraction stage determines the anticipated torque from a difference between the reduction torque and the actual torque value.

3. The apparatus as recited in claim 1 wherein the torque reduction determining device uses a characteristics diagram to determine the reduction torque.

4. The apparatus as recited in claim 2 wherein the torque reduction determining device uses a characteristics diagram to determine the reduction torque.

5. The apparatus as recited in claim 1, further comprising a limit function stage for determining the speed limit function if the actual speed value exceeds a maximum continuous speed.

6. The apparatus as recited in claim 5, wherein the limit function stage includes a timing element for defining a maximum speed that is greater than the maximum continuous speed for a time period, and further comprising a ramp generator for lowering the maximum speed to a level of the maximum continuous speed after the time period has elapsed.

7. The apparatus as recited in claim 5, wherein the speed limit function is configured as a limit speed.

8. The apparatus as recited in claim 5, further comprising a second subtraction stage for determining a difference between the speed limit function or the speed limit value and the actual speed value and for conveying the difference as an input to the controller.

9. The apparatus as recited in claim 1 further comprising a logic stage for determining an anticipated value as a function the gradient of the controlled variable and the speed limit value or speed limit function, the logic stage including a first comparison stage for activating the controller if the controlled variable is greater than an anticipated value and/or deactivating the controller if the controlled variable is not greater than the anticipated value.

10. The apparatus as recited in claim 2 further comprising a logic stage for determining an anticipated value as a function the gradient of the controlled variable and the velocity limit value or velocity limit function, the logic stage including a first comparison stage for activating the controller if the controlled variable is greater than an anticipated value and/or deactivating the controller if the controlled variable is not greater than the anticipated value.

11. The apparatus as recited in claim 9, wherein the logic stage includes a second comparison stage for deactivating the controller if the controlled variable falls below a predetermined value, the predetermined value being less than the anticipated value.

12. The apparatus as recited in claim 10, wherein the logic stage includes a second comparison stage for deactivating the controller if the controlled variable falls below a predetermined value, the predetermined value being less than the anticipated value.

13. The apparatus as recited in claim 1 wherein the controller includes a PI controller.

14. The apparatus as recited in claim 2 wherein the controller includes a PI controller.

15. The apparatus as recited in claim 1 wherein the engine is a combustion engine and the torque setpoint is used to regulate delivery of air and/or fuel to the engine.

16. The apparatus as recited in claim 2 wherein the engine is a combustion engine and the torque setpoint is used to regulate delivery of air and/or fuel to the engine.

17. The apparatus as recited in claim 15, wherein during the regulating, the combustion engine operates at a substantially stoichiometric ratio.

18. The apparatus as recited in claim 16, wherein during the regulating, the combustion engine operates at a substantially stoichiometric ratio.

* * * * *